(12) United States Patent
Yun

(10) Patent No.: US 8,724,138 B2
(45) Date of Patent: May 13, 2014

(54) IMAGE FORMING APPARATUS, IMAGE FORMING SYSTEM, AND METHOD TO AUTOMATICALLY ADJUST JOB COUNTERS

(75) Inventor: Eun Kyung Yun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1287 days.

(21) Appl. No.: 12/034,783

(22) Filed: Feb. 21, 2008

(65) Prior Publication Data

US 2008/0204797 A1 Aug. 28, 2008

(30) Foreign Application Priority Data

Feb. 24, 2007 (KR) ................................. 2007-18763
Feb. 12, 2008 (KR) ................................. 2008-12636

(51) Int. Cl.
*G06F 3/12* (2006.01)
*G06K 15/00* (2006.01)

(52) U.S. Cl.
USPC .......................................... 358/1.15; 358/1.16

(58) Field of Classification Search
USPC .................................................. 358/1.15, 1.16
See application file for complete search history.

(56) References Cited

U.S. PATENT DOCUMENTS

| | | | |
|---|---|---|---|
| 6,057,930 A | 5/2000 | Blossey et al. | |
| 6,088,550 A * | 7/2000 | Asai et al. ........................ | 399/79 |
| 7,426,048 B2 * | 9/2008 | Sakai et al. ................... | 358/1.14 |
| 2001/0022665 A1 | 9/2001 | Yajima et al. | |
| 2003/0137682 A1 | 7/2003 | Sakai et al. | |
| 2004/0083147 A1 | 4/2004 | Aoki | |
| 2004/0136025 A1 | 7/2004 | Moriyama et al. | |
| 2004/0158654 A1 * | 8/2004 | Shima .................. | 710/8 |
| 2006/0050291 A1 | 3/2006 | Morikawa et al. | |
| 2007/0047015 A1 * | 3/2007 | Yamada ........................ | 358/404 |
| 2008/0246993 A1 * | 10/2008 | Murakami et al. ........... | 358/1.15 |
| 2009/0165012 A1 * | 6/2009 | Corona ......................... | 718/105 |

FOREIGN PATENT DOCUMENTS

| | | |
|---|---|---|
| EP | 0 478 346 A2 | 4/1992 |
| EP | 1 424 627 A2 | 11/2003 |
| JP | 61-62063 | 3/1986 |
| JP | 8-63308 | 3/1996 |
| JP | 2006-76014 | 3/2006 |

OTHER PUBLICATIONS

European Search Report issued in European Patent Application No. 08 15 1777 on May 26, 2008.
European Office Action dated Nov. 23, 2010 in corresponding European Patent Application 08 151 777.3.
European Search Report dated Oct. 8, 2012 in corresponding European Patent Application 08 151 777.3.

* cited by examiner

*Primary Examiner* — Benny Q Tieu
*Assistant Examiner* — Sunil Chacko
(74) *Attorney, Agent, or Firm* — Staas & Halsey LLP

(57) ABSTRACT

An image forming apparatus, an image forming system, and a method to control the same, the method including: adjusting a count of a selected type of job of an image forming apparatus based on a count of another type of job, thereby achieving convenient management of the counts of the plurality of types of jobs.

25 Claims, 4 Drawing Sheets

IMAGE FORMING APPARATUS, IMAGE FORMING SYSTEM, AND METHOD TO AUTOMATICALLY ADJUST JOB COUNTERS

CROSS-REFERENCE TO RELATED APPLICATIONS

This application claims the benefit of Korean Application No. 2007-18763, filed Feb. 24, 2007 and No. 2008-12636, filed Feb. 12, 2008 in the Korean Intellectual Property Office, the disclosure of which is incorporated herein by reference.

BACKGROUND OF THE INVENTION

1. Field of the Invention

Aspects of the present invention relate to an image forming apparatus, an image forming system, and a method to control the same, and more particularly, to an image forming apparatus, an image forming system, and a method to control the same that automatically adjusts respective counts (for example, remaining operation counts) of a plurality of jobs to reduce management and time costs and to increase a convenience of use.

2. Description of the Related Art

Recently, a demand for office automation devices (such as printers, scanners, digital copiers, and facsimiles) has rapidly increased in conjunction with rapidly developing office automation. Accordingly, these office automation devices are being actively developed to expand their functionality.

A multi-function printer that integrates separately used office automation devices reduces a financial burden of the user and an installation space while also performing a hybrid document output function. An image forming system, which includes a host computer and a connected multi-function printer, allows convenient use of a variety of functions of the multi-function printer.

The manager of the image forming system presets the respective maximum counts of a variety of jobs (such as fax, print, scan, and copy jobs so as to perform the fax, print, scan, and copy functions, respectively). The maximum count of each job is the maximum allowable number of operations of the job. Specifically, the maximum count of each job is set to limit the amount of use of the job (specifically, the number of operations of the job) such that the number of operations does not exceed the maximum count. Conventionally, the maximum count of every job is set to the same value. This causes inconvenience of use to users who primarily use one job alone.

When the remaining count of a job selected by the user is deficient while the selected job is performed, the selected job stops performing. Thus, the user must ask the manager to reset the remaining count of the job in order to resume the job. This provides unsatisfactory job efficiency to the user and imposes upon the manager the burden of having to reset the job count, thereby increasing management and time costs.

SUMMARY OF THE INVENTION

Aspects of the invention to provide an image forming apparatus, an image forming system, and a method to control the same that automatically adjusts counts (for example, remaining operation counts) of a plurality of jobs to reduce management and time costs and to increase a convenience of use.

According to an aspect of the present invention, there is provided an image forming apparatus performing a first type of job from among a plurality of types of jobs, the apparatus including: a storage unit to store a count of the first type of job and a count of a second type of job, different from the first type of job, from among the plurality of jobs; and a controller to adjust the count of the first type of job based on the count of the second type of job if the count of the first type of job is less than a predetermined value.

The controller may increase the count of the first type of job by a value, and may decrease the count of the second type of job by the value.

The count of the second type of job is a highest from among the plurality of types of jobs.

The ratio of the count of the second type of job to a maximum count of the second type of job may be greater than a threshold value.

The plurality of types of jobs may include at least two from among a print job, a copy job, a scan job, and a fax job.

The print, scan, and copy jobs may each be classified into monochrome and color types.

The image forming apparatus may further include a display unit to display the count of the first type of job.

The controller may update respective maximum counts of the plurality of types of jobs according to respective frequencies of use of the plurality of types of jobs by users.

According to another aspect of the present invention, there is provided an image forming system including: an image forming apparatus to perform a plurality of types of jobs; and a host device to increase a count of a first type of job that is more frequently used by a value, and to decrease a count of a second type of job that is less frequently used by the value.

According to yet another aspect of the present invention, there is provided a method of performing a first type of job on an image forming apparatus that performs a plurality of types of jobs, the method including: checking a count of a the first type of job; and adjusting the count of the first type of job based on a count of a second type of job, different from the first type of job, if the count of the first type of job is less than a predetermined value.

Adjusting the count of the first type of job may include: increasing the count of the first type of job by a count deficit; and decreasing the count of the second type of job by the count deficit.

According to still another aspect of the present invention, there is provided a host device to manage respective counts of a plurality of types of jobs of an image forming apparatus, the host device including: a controller to increase a count of a first type of job by a value and to decrease a count of a second type of job by the value when the count of the first type of job is less than a predetermined value.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
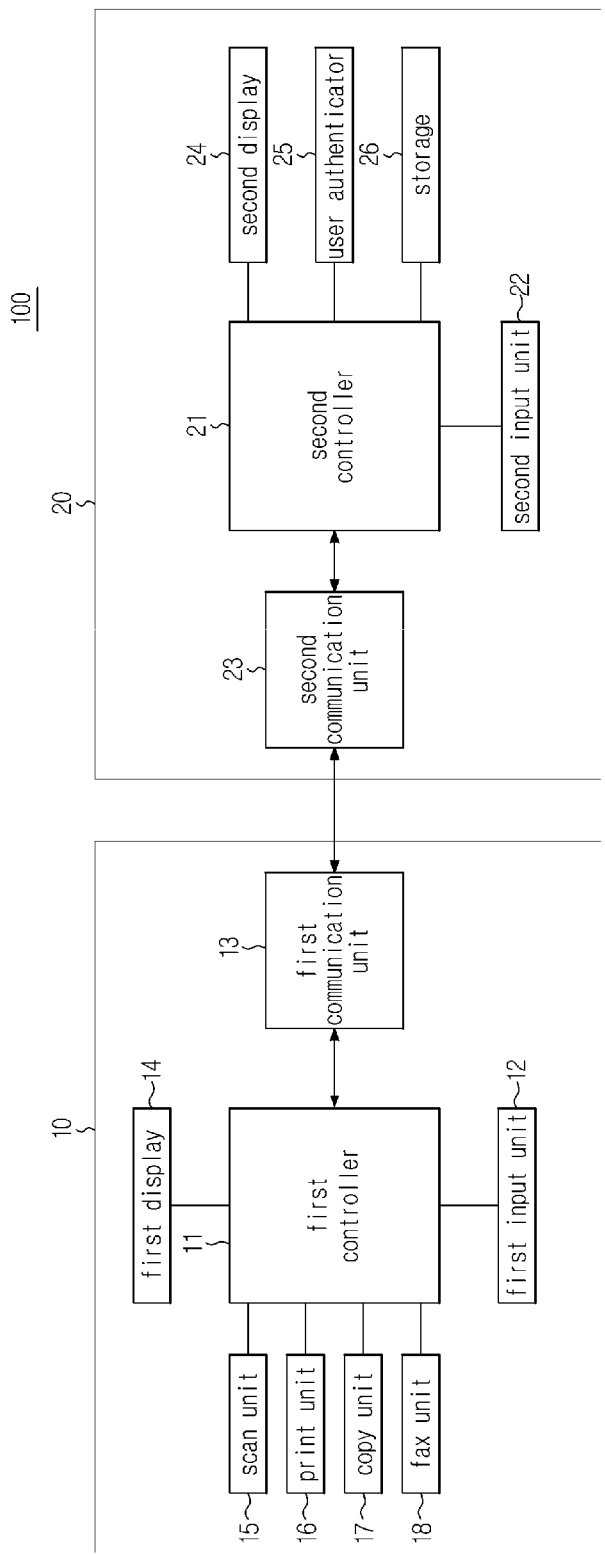
FIG. 1 is a block diagram of an image forming system according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of an image forming system 100 according to an embodiment of the present invention. Referring to FIG. 1, the image forming system 100 includes an image forming apparatus 10 and a host computer 20. The image forming apparatus 10 performs a plurality of jobs (such as print, copy, scan, and fax). The host computer 20 is connected to the image forming apparatus 10 such that the image forming apparatus 10 and the host computer 20 communicate data according to a preset communication protocol.

The image forming apparatus 10 includes a first controller 11, a first input unit 12, a first display unit 14, and a first communication unit 13. The first input unit 12 receives user input commands. The first display unit 14 displays various messages and operating states of the image forming apparatus 10. The first communication unit 13 communicates with the host computer 20. The image forming apparatus 10 further includes a scan unit 15, a print unit 16, a copy unit 17, and a fax unit 18 to process the respective jobs.

The host computer 20 includes a second controller 21, a second input unit 22, a second communication unit 23, a second display unit 24, a user authenticator 25, and a storage unit 26. The second input unit 22 receives user input commands. The second communication unit 23 communicates with the image forming apparatus. The second display unit 24 displays various messages and operating states.

The first controller 11 is connected to the scan unit 15 that performs scan jobs, the print unit 16 that performs print jobs, the copy unit 17 that performs copy jobs, and the fax unit 18 that performs fax jobs.

The user selects a desired job and inputs a command to perform the job using the first input unit 12 or the second input unit 22. Accordingly, commands input through the first input unit 12 are provided directly to the first controller 11 and commands input through the second input unit 22 are provided to the first controller 11 through the second communication unit 23 and the first communication unit 13.

The first controller 11 controls the scan unit 15, the print unit 16, the copy unit 17, and the fax unit 18 to perform corresponding jobs according to user commands input to the first controller 11 via the first input unit 12 or the second input unit 22.

The first controller 11 transmits a job operation result to the host computer 20 through the first communication unit 13. Specifically, the job operation result is transferred to the second controller 21 through the second communication unit 23 and the first communication unit 13. The second controller 21 receives the job operation result and transmits control commands to the first controller 11 to control corresponding job operations.

The second controller 21 updates a remaining count of each job according to the operation result of the job. When the updated remaining count of a job is zero, the second controller 21 adjusts the remaining count of the running job using a remaining count of another job to continue the running job.

However, according to aspects of the present invention, when an automatic job count adjustment function is disabled, the second controller 21 may alert a user by displaying an alarm message on the second display unit 24 and/or transmitting a control command for an alarm message to the first controller 11 to display an alarm message on the first display unit 14.

The user authenticator 25 stores respective information and authentication keys of a plurality of users, while the storage unit 26 stores maximum counts and threshold values of the plurality of jobs. Specifically, the user authenticator 25 stores information of users who use the plurality of jobs and authenticates users to determine if they are permitted to use the jobs through respective identifications (IDs) and passwords of the users.

Furthermore, the user authenticator 25 creates and stores data regarding the frequency of use of each job by users and other job usage-related information (such as whether a user is permitted to use a job). This user authenticator 25 may edit the frequency of use of each job for each user through an authentication of each user. Accordingly, the user authenticator 25 creates and provides data regarding jobs mainly used by each user, which is factored in when setting the maximum count of each job.

When the automatic job count adjustment function is enabled, the second controller 21 performs a job selected by the user if the remaining count of the selected job for the user is greater than zero. On the other hand, if the remaining count of the selected job is zero, the second controller 21 automatically adjusts the remaining count of the selected job by transferring, to the remaining count of the selected job, a count from the remaining count of another job. Here, the second controller 21 determines whether it is possible to transfer a count from the remaining count of another job to automatically adjust the remaining count of the selected job. More specifically, the second controller 21 may choose a job with a highest remaining count for the user and adjusts the remaining count of the selected job by transferring a count from the remaining count of the chosen job to the remaining count of the selected job. Moreover, the second controller 21 may only transfer the count if the remaining count of the chosen job satisfies a condition that the ratio of the remaining count to the maximum count of the chosen job is greater than a threshold value. However, it is understood that aspects of the present invention are not limited thereto. For example, the second controller may condition the transfer by determining if the remaining count is greater than a threshold value.

A manager may set default maximum counts and threshold values of the plurality of jobs. After the default maximum counts and threshold values of the jobs are set, the maximum count and threshold value of each of the jobs may be adjusted according to the frequency of use of each job by users. That is, the user authenticator 25 may provide the respective frequencies of use of the jobs by users to the second controller 21. Accordingly, the second controller 21 updates the maximum counts and threshold values of the jobs based on the respective frequencies of use of the jobs by users and stores the updated maximum counts and threshold values in the storage unit 26.

Figure 2:
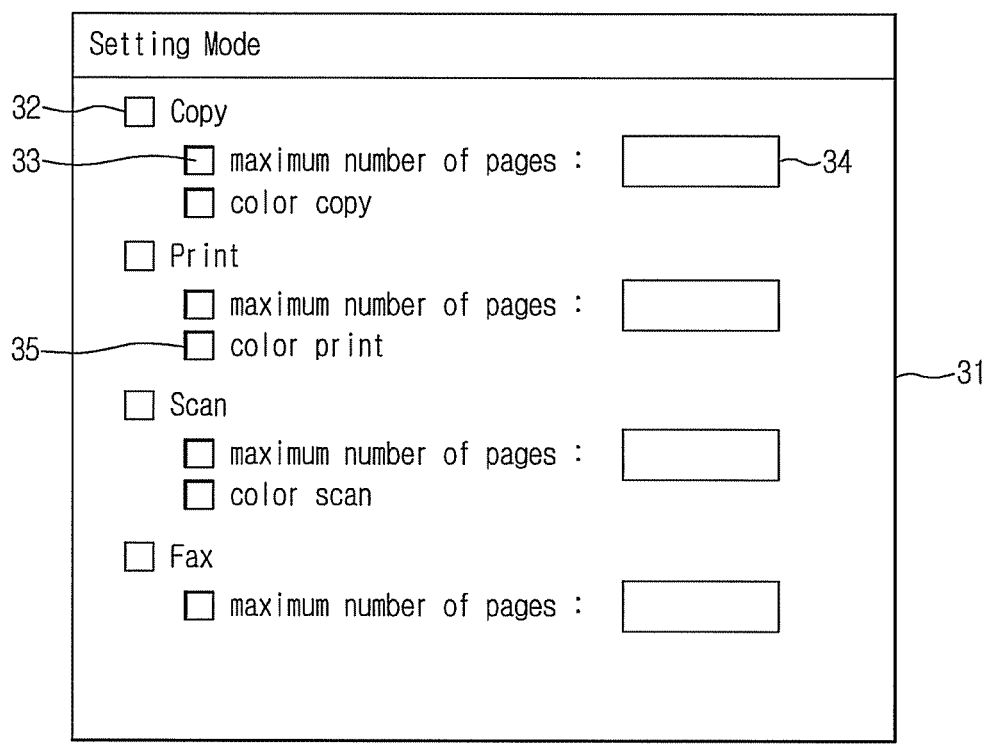
FIG. 2 illustrates a maximum job count setting portion according to an embodiment of the present invention.

A method of setting default maximum counts and job-count-related threshold values of a plurality of jobs will now be described with reference to FIGS. 2 and 3. FIG. 2 illustrates a maximum job count setting portion 30 to set maximum counts according to an embodiment of the present invention. The maximum job count setting portion 30 is provided through the second display unit 24 of the host computer 20 and/or the first display unit 14 of the image forming apparatus 10.

Referring to FIG. 2, the maximum job count setting portion 30 may be set for each user and each job, or may be set for specific users and/or specific jobs. Furthermore, the maximum job count setting portion 30 includes a first setting mode 31 that provides first to fourth selection sections 32, 33, 34, and 35 portions. The first selection section 32 is used to select a job to set from among the plurality of jobs (such as scan, print, copy, and fax). According to aspects of the present invention, more than one job may be selected.

The second selection section 33 is used to select whether to set the maximum (or upper limit) count of the job selected through the first selection section 32. The third selection section 34 is used to set the maximum count of each job. The fourth selection section 35 is used to select either a color or monochrome type for each of the plurality of jobs. It is understood that aspects of the present invention are not limited to the four selection sections 32, 33, 34, and 35 as described above. For example, the fourth selection section 35 may be omitted according to other aspects.

The second controller 21 may adjust the settings of the maximum job count setting portion 30 according to the frequency of use of each job by users provided from the user authenticator 25 after a default setting of the maximum job count setting portion 30. For example, if the user uses the print job at the highest frequency among the plurality of jobs and uses the copy, scan, and fax jobs in order of decreasing frequency of use, the maximum count of the print job (printer) may be adjusted to 200, the maximum count of the copy job (copier) may be adjusted to 80, the maximum count of the scan job (scanner) may be adjusted to 20, and the maximum count of the fax job (facsimile) may be adjusted to 10.

Furthermore, according to aspects of the present invention, the maximum count of a color type may be set to be less than that of a monochrome type in order to cope with higher ink costs of the color type.

Figure 3:
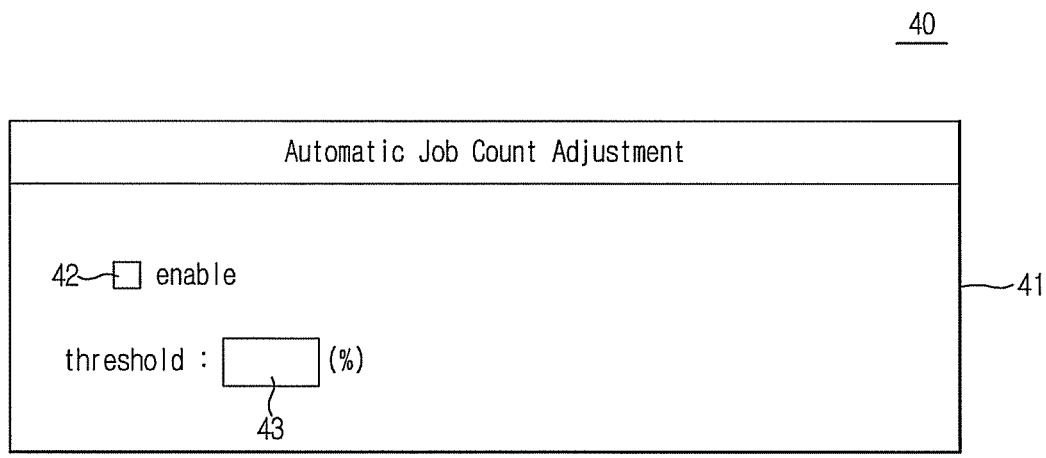
FIG. 3 illustrates a job-count-related threshold value setting portion according to an embodiment of the present invention.

FIG. 3 illustrates a job-count-related threshold value setting portion 40 according to an embodiment of the present invention. The job-count-related threshold value setting portion 40 is used to set a threshold value for comparison with the ratio of the remaining to maximum counts of another job of a user when the remaining count of a job selected by the user is reduced to a value requiring an adjustment of the remaining count of the selected job. The job-count-related threshold value setting portion 40 is provided through the second display unit 24 of the host computer 20 and/or through the first display unit 14 of the image forming apparatus 10.

Referring to FIG. 3, the job-count-related threshold value setting portion 40 includes a second setting mode 41 that provides first and second selection sections 42 and 43. The first selection section 42 is used to select whether to enable the job count adjustment function and the second selection section 43 is used to set a threshold value for a selected job. It is understood that aspects of the present invention are not limited to the first and second selection sections 42 and 43, and other input formats may be used to set a threshold value for a selected job.

Furthermore, the second controller 21 may adjust the job-count-related threshold value according to the frequency of use of each job by users provided from the user authenticator 25 after the default setting of the maximum job count setting portion 40.

Figure 4:
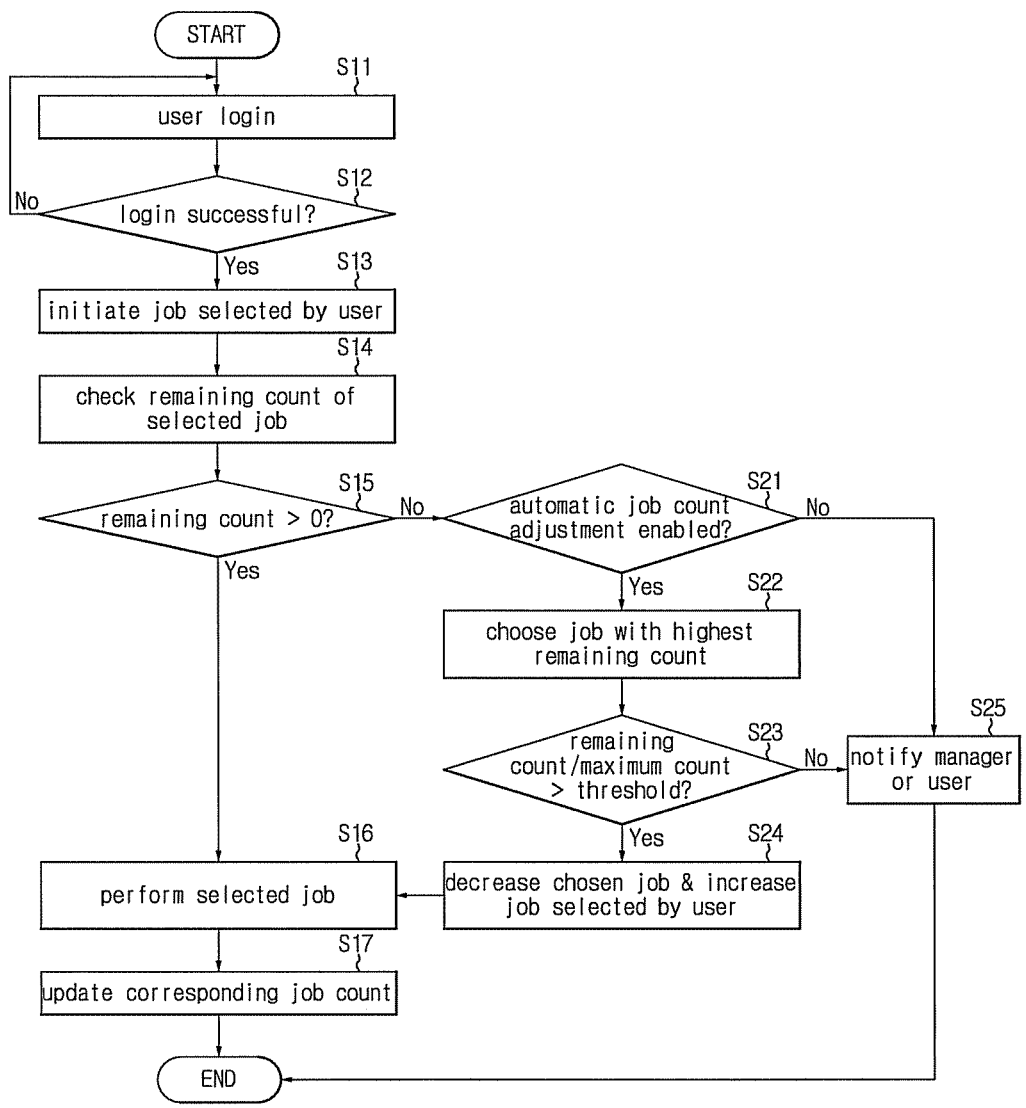
FIG. 4 is a flow chart of a method to control an image forming system according to an embodiment of the present invention.

FIG. 4 is a flow chart of a method to control an image forming system according to an embodiment of the present invention. The method to control an image forming system automatically adjusts the remaining count of at least one job when the user selects and uses the at least one job from among the plurality of jobs. This method is described below with reference to an example in which the user uses the print job among the plurality of jobs such as print, copy, scan, and fax. However, it is understood that this is a non-limiting example, and aspects of the present invention are also applicable to copy, scan, and fax jobs, among others.

Referring to FIGS. 1 and 4, the image forming system authenticates a user in order to perform the print job selected by the user in operation S11. For example, the user authenticator 25 may control a message asking for the user's ID and password to be displayed on the display unit 24, whereby the user then enters the ID and password. If the authentication fails in operation S12, the user authentication is repeated. Here, the user authenticator 25 edits the frequency of use of each job for each user through authentication of each user. Furthermore, the user authenticator 25 may also create and store data regarding jobs mainly used by each user.

Upon completion of the user authentication, the print job is initiated in operation S13. The print job may be initiated according to a user command. While initiating the print job, the second controller 21 receives and checks the remaining count of the print job from the storage unit 26 in operation S14. The second controller 21 then determines whether the remaining count of the print job received from the storage unit 26 is greater than zero in operation S15.

If the remaining count of the print job received from the storage unit 26 is zero, the second controller 21 determines whether automatic job count adjustment is possible (i.e., enabled) in operation S21. If it is determined that the automatic job count adjustment function for the print job is disabled (operation S21), the second controller 21 notifies the manager or user in operation S25.

If it is determined that the automatic job count adjustment function for the print job is enabled (operation S21), the second controller 21 compares the remaining counts of the copy, scan, and fax jobs, and selects one of the copy, scan, and fax jobs that has the highest remaining count in operation S22. For example, if the remaining count of the scan job is greater than that of any of the copy and fax jobs, the second controller 21 selects the scan job.

The second controller 21 then determines whether it is possible to transfer a count from the remaining count of the scan job to the remaining count of the print job in operation S23. Specifically, the second controller determines whether a ratio of the remaining count to the maximum count is greater than a threshold value. The threshold value may be changed according to the frequency of use of each job by each user provided from the user authenticator 25 after a default setting of the threshold value is set. If it is determined that it is possible to transfer a count from the remaining count of the scan job, the second controller 21 transfers a count required for the print job to the remaining count of the print job in operation S24. For example, if the remaining count required to complete the print job selected by the user is 10, the remaining count of the scan job is decreased by 10 and the remaining count of the print job is increased to 10. According to other aspects, even though the count required to complete the print job is 10, more than 10 may be subtracted from the remaining count of the scan job and be added to the remaining count of the print job. That is, it is possible to preset a count higher than the required count to be transferred from the remaining count of the scan job to the remaining count of the print job.

If it is determined that the remaining count of the print job is greater than zero (operation S15) or if the job count is adjusted otherwise (operation S24), then the second controller 21 performs the print job operation in operation S16 and updates the remaining count of the print job according to the result of the print job operation in operation S17.

If it is determined that it is not possible to transfer a count from the remaining count of the scan job to the remaining count of the print job (operation S23), the second controller 21 notifies the manager and/or user in operation S25. For example, the second controller 21 may control the second display unit 24 to display an alarm message and request that the first controller 11 control the first display unit 14 to display an alarm message to the manager and/or the user.

As is apparent from the above description, the image forming apparatus, the image forming system, and the method to control the same according to aspects of the present invention automatically adjust the remaining count of a job selected by the user using the remaining count of another job if the remaining count of the selected job is deficient when the selected job is performed, thereby decreasing management and time costs.

Aspects of the present invention can also be embodied as computer-readable codes on a computer-readable recording medium. Also, codes and code segments to accomplish the present invention can be easily construed by programmers skilled in the art to which the present invention pertains. The computer-readable recording medium is any data storage device that can store data which can be thereafter read by a computer system or computer code processing apparatus. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image forming apparatus performing a first type of job from among a plurality of types of jobs, the apparatus comprising:
   a storage unit to store a remaining count of the first type of job and a remaining count of a second type of job, different from the first type of job, from among the plurality of types of jobs; and
   a controller to adjust the remaining count of the first type of job based on the remaining count of the second type of job when the remaining count of the first type of job is less than a predetermined value,
   wherein a remaining count is an allowable number of operations of a job.

2. The image forming apparatus as claimed in claim 1, wherein the controller adjusts the remaining count of the first type of job based on a count-related threshold value of the second type of job.

3. The image forming apparatus as claimed in claim 1, wherein the controller increases the remaining count of the first type of job by a first value and decreases the remaining count of the second type of job by a second value.

4. The image forming apparatus as claimed in claim 3, wherein the remaining count of the second type of job is a highest count from among the plurality of types of jobs of the image forming apparatus.

5. The image forming apparatus as claimed in claim 3, wherein a ratio of the remaining count of the second type of job to a maximum count of the second type of job is greater than a threshold value.

6. The image forming apparatus as claimed in claim 5, wherein the controller updates respective maximum counts of the plurality of types of jobs according to respective frequencies of use of the plurality of types of jobs.

7. The image forming apparatus as claimed in claim 3, wherein the first value and the second value are equal.

8. The image forming apparatus as claimed in claim 1, wherein the plurality of types of jobs includes at least two from among a print job, a copy job, a scan job, and a fax job.

9. The image forming apparatus as claimed in claim 8, wherein the print, scan, and/or copy jobs are each classified into monochrome and color types.

10. The image forming apparatus as claimed in claim 1, further comprising a display unit to display the remaining count of the first type of job.

11. An image forming system comprising:
    an image forming apparatus to perform a plurality of types of jobs; and
    a host device to increase a remaining count of a first type of job that is more frequently used by a value, and to decrease a remaining count of a second type of job that is less frequently used by the value,
    wherein a remaining count is an allowable number of operations of a job.

12. The image forming system as claimed in claim 11, wherein the host device compares respective counts of the plurality of types of job in order to determine the first type of job that is more frequently used and the second type of job that is less frequently used.

13. The image forming system as claimed in claim 11, wherein the host device increases the remaining count of the first type of job when the remaining count of the first type of job is less than a predetermined value.

14. The image forming system as claimed in claim 11, wherein the remaining count of the second type of job is a highest count from among the plurality of types of jobs.

15. The image forming system as claimed in claim 11, wherein a ratio of the remaining count of the second type of job to a maximum count of the second type of job is greater than a threshold value.

16. A method of performing a first type of job on an image forming apparatus that performs a plurality of types of jobs, the method comprising:
    checking a remaining count of the first type of job; and
    adjusting the remaining count of the first type of job based on a remaining count of a second type of job, different from the first type of job, when the remaining count of the first type of job is less than a predetermined value,
    wherein a remaining count is an allowable number of operations of a job.

17. The method as claimed in claim 16, further comprising authenticating a user.

18. The method as claimed in claim 16, wherein the adjusting of the remaining count of the first type of job comprises:
    increasing the remaining count of the first type of job by a count deficit; and
    decreasing the remaining count of the second type of job by the count deficit.

19. The method as claimed in claim 18, wherein the adjusting of the remaining count of the first type of job further comprises determining the second type of job with a highest remaining count from among the plurality of types of jobs.

20. The method as claimed in claim 19, wherein:
the adjusting of the remaining count of the first type of job further comprises determining whether a ratio of the remaining count of the second type of job to a maximum count of the second type of job is greater than a threshold value;
the increasing of the remaining count of the first type of job comprises increasing the remaining count of the first type of job when the ratio is greater than the threshold value; and
the decreasing of the remaining count of the second type of job comprises decreasing the remaining count of the first type of job when the ratio is greater than the threshold value.

21. The method as claimed in claim 20, wherein the threshold value is set by a manager of the image forming apparatus.

22. The method as claimed in claim 16, wherein the plurality of types of jobs includes at least two from among a print job, a copy job, a scan job, and a fax job.

23. The method as claimed in claim 22, wherein the print, scan, and/or copy jobs are each classified into monochrome and color types.

24. A host device to manage respective counts of a plurality of types of jobs of an image forming apparatus, the host device comprising:
a controller to increase a remaining count of a first type of job by a first value and to decrease a remaining count of a second type of job by a second value when the count of the first type of job is less than a predetermined value,
wherein a remaining count is an allowable number of operations of a job.

25. The host device as claimed in claim 24, wherein the first value and the second value are equal.

* * * * *